United States Patent [19]

Tseng et al.

[11] Patent Number: 5,376,689
[45] Date of Patent: Dec. 27, 1994

[54] AMINATED POLYSULFONE MEMBRANE AND PROCESS FOR ITS PREPARATION

[75] Inventors: Tsai-Wie Tseng; Tze-Chiang Chiao, both of Hsinchu; Chin-Chih Chou, Miao-li Hsuan, all of Taiwan, Prov. of China

[73] Assignee: Industrial Technology Research Institute, Hsinchu, Taiwan, Prov. of China

[21] Appl. No.: 116,296

[22] Filed: Sep. 3, 1993

[51] Int. Cl.$^5$ ................................................ C08J 5/20
[52] U.S. Cl. ...................................... 521/27; 524/127; 524/145; 524/284; 524/297; 424/78.08; 424/78.1
[58] Field of Search ............... 524/145, 127, 297, 360, 524/284; 424/78.08, 78.1; 521/27

[56] References Cited

U.S. PATENT DOCUMENTS 5,180,750  1/1993  Sugaya et al. .................. 521/32
5,236,643  8/1993  Tseng et al. .................... 264/41

*Primary Examiner*—Paul R. Michl
*Assistant Examiner*—U. K. Rajguru
*Attorney, Agent, or Firm*—Darby & Darby

[57] ABSTRACT

A new process for preparing a separation membrane from aminated polysulfone resin or blends of aminated polysulfone-blended materials which utilizes an organic additive having a low or negligible water-solubility (instead of conventional water-soluble organics, polymers, or inorganic salts) in the casting solution. The resulting membrane exhibits high water-permeability and is capable of being formed at a high production rate when using a wet casting machine.

9 Claims, No Drawings

AMINATED POLYSULFONE MEMBRANE AND PROCESS FOR ITS PREPARATION

BACKGROUND OF THE INVENTION

Polysulfone resin has been widely used to prepare separation membranes. However, since it is hydrophobic, its membranes tend to precipitate impurities, resulting in dramatically decreased water flux. It has been suggested to convert the polysulfone resin into a sulfonated polysulfone resin (C. Friedrich et al., "Asymmetric Reverse Osmosis and Ultrafiltration Membranes Prepared from Sulfonated Polysulfone," Desalination, 36 (1981), 39–62), or into aminated polysulfone (Japanese Provisional Application (A) No. 62-42704). The sulfonated or aminated polysulfone membranes have increased hydrophilicity and a wider range of uses.

In conventional processes for converting aminated polysulfone resin to the desired membrane, a solution of the polymer is formed containing a water-soluble additive, e.g., water-soluble polymers, organic compounds, or inorganic salts. Examples of water-soluble polymer additives include polyethylene glycol, polypropylene glycol, and polyvinylpyrrolidone. Examples of water-soluble organic compounds include ethylene glycol, glycerol, and propylene glycol. Examples of water-soluble inorganic salts include lithium nitrate and lithium chloride.

The solution having the water-soluble additives denoted above are conventionally cast onto a woven or non-woven reinforced cloth and the solvent thereafter evaporated. The cast reinforced cloth is immersed in a gelation medium, such as ice water, to form the membrane product.

In Japanese Provisional Application (A) No. 62-42704, water-soluble lithium nitrate is used in a casting solution of aminated polysulfone. The solution must be evaporated at a temperature of over 50° C, and, to prepare a suitable membrane, the processing times used are 40, 50, 60, and 70 minutes. For this reason, the process is unsuitable for use with a conventional wet casting machine and high industrial production rate cannot be achieved.

In sum, such conventional processes and the membrane thereby obtained have significant disadvantages. They cannot effectively be employed for mass production when using a wet casting machine. High production rate cannot be realized because of the long period for evaporation of solvent.

Moreover there is the desire to produce an aminated separation membrane of high permeability to water, as well as a membrane having improved ability to separate and recover materials having cationic functional groups, such as dyestuffs, amino acids, and cationic electro-deposition paint.

BRIEF DESCRIPTION OF THE INVENTION

The present invention provides an improved separation membrane and a process for its preparation. The separation membrane is made from a casting solution composed of an aminated polysulfone resin or blends of aminated polysulfone and suitable blending materials and an organic additive having low or negligible water-solubility in an organic solvent. This contrasts with the use of water-soluble additives such as shown in the Japanese application. The process is capable of being performed at a high production rate in a commercial wet casting machine. The resulting aminated polysulfone membrane has superior properties, such as high water flux and the ability to separate materials having cationic functional groups.

The basic process employed involves the following combination of steps:

(1) Preparation of the casting solution by mixing an aminated polysulfone resin or blended aminated polysulfone with conventional solvents and an organic additive having low or negligible water-solubility (generally less than 50 g/l, preferably less than 10 g/l in water at 20° C.). The mixture is stirred until the resin is completely dissolved. The organic additive may be added before, after, or simultaneously with the aminated polysulfone resin or the blend material.

(2) Application of the resinous casting solution to a cloth substrate (woven or unwoven, but normally reinforced) by a conventional casting process. Typically the resin thickness is 3 to 25 mils, preferably 6 to 12 mils, and the application is at room temperature. The present process is particularly suitable for being performed by a conventional wet casting process.

(3) Gelation of the casting solution on the substrate to form the membrane by immersing the coated cloth into a suitable medium, such as ice water or an organic non-solvent at a temperature of 5° to 15° C. Normally solvent is first evaporated in a rapid manner, e.g., an evaporation period up to 10 seconds.

DETAILED DESCRIPTION OF THE INVENTION

The aminated polysulfones of the present invention are:

1. Aminated polysulfone, per se. Such polymers are known in the art and can be made by treating polysulfone resin with chloromethylether and triethylamine, such as described in Japanese Professional Application (A) No 62-42704 cited previously. A preferred process is to react commercial polysulfone with trioxane and hydrogen chloride gas under the catalytic effect of acetic anhydride and zinc chloride. The amination reaction is carried out by reacting the chloromethylated polysulfone with triethylamine.

2. Aminated polyethersulfone, aminated polyarylsulfone, especially aminated polyphenylsulfone, and aminated polyphenylsulfone.

3. Blends of aminated polysulfone, such as aminated polysulfone/polysulfone (in a weight percentage of 5 to 70% aminated polysulfone of total blend); aminated polysulfone/polydifluoroethylidene (in a weight percentage of 5 to 50% aminated polysulfone to total blend), and aminated polysulfone/polyolefin such as polyvinyl found (in the weight percentage of 5 to 50% of aminated polysulfone to total blend).

Conventional solvents for dissolving aminated polysulfone are used. Illustrative solvents, include N-methyl-2-pyrrolidone, N,N-dimethylformamide, N,N-dimethylacetamide and dimethylsulfoxide.

The organic additive having low or negligible water-solubility is selected from the groups dialkyl $C_1$–$C_{10}$ phthalates, such as dimethylphthalate, dibutylphthalate, and dioctylphthalate (di(2-ethylhexyl)phthalate); trialkyl $C_1$–$C_6$ phosphates, such as trimethylphosphate and triethylphosphate; ketones, such as cyclohexanone, and diethylketone; unsaturated carboxylic acids, such as maleic acid and fumaric acid. By the phrase "low or negligible water-solubility" is meant a solubility of less than 50 g/liter of water at ambient conditions (20° C.).

The casting solution will typically contain (weight percent):

|  | Broad Range | Preferred Range |
|---|---|---|
| Aminated Polysulfone or Blend | 5 to 35 | 10 to 30 |
| Organic Additive Compound | 1 to 30 | 5 to 20 |

The balance of the solution is solvent.

The resultant aminated polysulfone membrane produced by the present invention has various advantageous characteristics:

(a) High water flux or permeability.

(b) Good ion exchange capacity, such as 0.05 to 1.5, preferably 0.2 to 0.5, milliequivalent/g.

(c) High solute rejection due to the improved hydrophilicity of the aminated polysulfone membrane surface. This decreases fouling of the membrane.

While not fully understood, studies under the electron microscope and test data suggest that the sponge structure normally associated with the use of aminated polysulfone membranes made by conventional methods are converted into a finger-like structure when the present organic additive of low or negligible solubility is employed. The additive accelerates the gelation rate to form a membrane with a fingerlike structure which is more hydrophilic. This fingerlike structure across the cross-sectional view of the separation membrane provides high water flux. Thus a significant improvement in water flux is realized.

This same structural characteristic makes the present membranes especially useful for separating and recovering valuable materials having cationic functional groups, such as dye-stuffs and amino acids, and treatment of cationic electro-deposition paint.

The following examples will serve to illustrate the invention and preferred embodiments thereof. All parts and percentages in the specification, examples, and claims are by weight unless otherwise indicated.

EXAMPLES

Example 1

4.5 g of polysulfone, 4.5 g of aminated polysulfone resin (ion exchange capacity is 0.7 milliequivalent/g), and 3 g of cyclohexanone (as additive) were added to 38 g of N-menhyl-2-pyrrolidone (as solvent) to prepare a casting solution. The casting solution was then spread on a non-woven cloth with a glass rod after the mixture was dissolved, filtered, and defoamed. After the solvent of the casting solution was allowed to evaporate for a period of 10-15 seconds, the non-woven cloth with the casting solution spread thereon was immersed in 10° C. ice water to gel and form a membrane.

The performances of the resulting membrane were determined by thin channel flow ultrafiltration testing apparatus. The results were reported in pure water permeability (PWP)in terms of GFD (gal/ft$^2$/day) and rejection ratio (%) of solute for the polyethylene glycol (MW=100,000) aqueous solution. These test procedures are described in the Journal of Applied Polymer Science, Vol. 14 (1970), pp 1197-1214.

Operation conditions were 30psi and 25° C. The tested flux and solute rejection performance of the membrane were 330 GFD of pure water permeability and 70% solute rejection.

Example 2

The same process was employed as in Example 1, except 6 g of dimethyl phthalate was used as the additive instead of cyclohexanone. The test results for the resultant membrane were 260 GFD of pure water permeability and 71% solute rejection.

Example 3

The same process was employed as in Example 1, except 6 g of trimethyl phosphate was used as the additive instead of cyclohexanone. The test results for the resultant membrane were 280 GFD of pure water permeability and 64% solute rejection.

Examples 1-3 thus illustrate that the aminated polysulfone membranes of the present invention have high water flux or permeability as well as high solute rejection.

Example 4

20% by weight of cationic electro-deposition paint was used as the test solution for long-term antifouling test of the following membranes.

Polysulfone membrane was dissolved in 41 g of N-methyl-2-pyrrolidone, 3 g of glycerin as additive. The procedure for preparing the membrane was the same as described in Example 1. The membrane was denoted "PSM-01".

For comparison, the long-term antifouling tests were conducted for both polysulfone and aminated polysulfone membranes made according to the present invention.

The four membranes denoted in Table 1 were connected in series in four test cells. Cationic electro-deposition paint (sold by PPG Industries, Inc.) was employed as feed material and 2 kg/m$^2$ operating pressure was maintained. The water flux through the membrane was measured. The results are shown in Table 1 below.

TABLE 1

| Duration of Operation (Hour) | Water Flux (GFD) | | | |
|---|---|---|---|---|
|  | Polysulfone Membrane (PSM-01) | Aminated Polysulfone Membrane | | |
|  |  | Example 1 | Example 2 | Example 3 |
| 0 | 35 | 35 | 32 | 33 |
| 50 | 12 | 34 | 31 | 32 |
| 300 | 10 | 34 | 30 | 32 |
| 500 | 8 | 34 | 30 | 32 |

As shown in Table 1, the aminated polysulfone membranes of the present invention exhibited excellent antifouling characteristics to cationic electro-deposition paint. Water flux remained essentially constant at 30 GFD or better over 500 hours of operation, as compared to a 77% reduction when using a conventional polysulfone membrane.

Example 5

Table 2 below compares the properties of a membrane composed of 4.5 g polysulfone and 4.5 g of aminated polysulfone resin with a water-soluble additive (glycerin) and with organic additives of low solubility (Examples 1-3). Tests were conducted as described in Examples 1-3.

TABLE 2

| | COMPARATIVE MEMBRANE | EXAMPLE 1 | EXAMPLE 2 | EXAMPLE 3 |
|---|---|---|---|---|
| ADDITIVE | Glycerin (3 g) | Cyclohexanone (3 g) | Dimethylphthalate (6 g) | Trimethylphosphate (6 g) |
| Pure Water Permeability (GFD) | 71 | 330 | 260 | 280 |
| Solution Rejection % | 76 | 70 | 71 | |
| Structure | Spongelike | Fingerlike | Fingerlike | Fingerlike |

As shown, water-soluble additives, such as glycerine, induce a spongelike structure in the membrane and result in lower water flux. With respect to Examples 1 to 3, the embodiments of the instant invention, the organic additives of low or negligible solubility induce the hydrophilic aminated polysulfone to form a fingerlike structure and result in higher water flux.

As will be understood by those skilled in the art, various modifications may be made to the present invention without departing from the spirit thereof.

What is claimed is:

1. In a process for preparing a separation membrane wherein a casting solution of an aminated polysulfone resin in a solvent is cast on the surface of a cloth and wherein the cloth having the cast solution on the surface is contacted with a gelation medium to form a membrane, the improvement which comprises adding to said casting solution an organic additive which is dialkyl $C_1$–$C_{10}$ phthalate, a trialkyl $C_1$–$C_6$, phosphate, a ketone or an unsaturated carboxylic acid and has a water-solubility of less than 50 g/l and water at 20° C., thereby improving the properties of the resultant membrane.

2. The improvement of claim 1, wherein said organic additive is selected from the group consisting of triethyl phosphate, trimethylphosphate, cyclohexanone, dimethylphthalate, dibutylphthalate, dioctylphthalate, maleic acid, and fumaric acid.

3. The improvement of claim 1, wherein said aminated polysulfone resin is selected from the group consisting of an aminated polysulfone, an aminated polyethersulfone, and an aminated polyarylsulfone.

4. The improvement of claim 1, wherein said aminated polysulfone resin is a blended material selected from the group consisting of aminated polysulfone/polysulfone and aminated Polysulfone/polydifluoroethylidene.

5. The improvement of claim 1, wherein said casting solution contains from 1 to 30% by weight, based on the total weight of the casting solution, of said organic additive.

6. The improvement of claim 1, wherein said aminated polysulfone membrane thus formed has an ion exchange capacity between 0.05 and 1.5 milliequivalent/g.

7. The improvement of claim 1, wherein the resultant membrane has improved ability to separate materials having cationic functional groups.

8. An aminated polysulfone resin membrane made by the process of claim 1.

9. The aminated polysulfone resin membrane of claim 8 wherein the resin is selected from the group consisting of aminated polysulfone, aminated polyethersulfone, aminated polyarylsulfone, and blends of aminated polysulfone with polysulfone and polydifluoroethylidene.

* * * * *

UNITED STATES PATENT AND TRADEMARK OFFICE
CERTIFICATE OF CORRECTION

PATENT NO. : 5,376,689
DATED : December 27, 1994
INVENTOR(S) : Tsai-Wie TSENG, Tze-Chiang CHIAO and Chin-Chih CHOU It is certified that error appears in the above-indentified patent and that said Letters Patent is hereby corrected as shown below:

Title page, [75] Inventors:, change "Prov. of China" to --Republic of China--.

[73] Assignee:, change "Prov. of China" to --Republic of China--.

Signed and Sealed this

Fourteenth Day of March, 1995

*Attest:*

BRUCE LEHMAN

*Attesting Officer*  *Commissioner of Patents and Trademarks*